US007627331B2

(12) United States Patent
Winterbottom et al.

(10) Patent No.: US 7,627,331 B2
(45) Date of Patent: Dec. 1, 2009

(54) RELATING TO INTERNET PROTOCOL (IP) LOCATION, PRIVACY AND PRESENCE

(75) Inventors: James Winterbottom, Gwynneville (AU); Martin Dawson, West Wollongong (AU); Martin Thomson, Helensburgh (AU)

(73) Assignee: Nortel Networks Limited, St. Laurent, Quebec (CA)

( * ) Notice: Subject to any disclaimer, the term of this patent is extended or adjusted under 35 U.S.C. 154(b) by 485 days.

(21) Appl. No.: 11/257,709

(22) Filed: Oct. 25, 2005

(65) Prior Publication Data
US 2006/0135177 A1    Jun. 22, 2006

(51) Int. Cl.
*H04Q 7/20* (2006.01)
(52) U.S. Cl. ................ 455/456.1; 455/456.2
(58) Field of Classification Search .......... 455/456.1, 455/456.2, 456.3, 433, 435, 440
See application file for complete search history.

(56) References Cited

U.S. PATENT DOCUMENTS

| 7,088,237 B2 * | 8/2006 | Arcens ................ 340/539.13 |
| 7,242,946 B2 * | 7/2007 | Kokkonen et al. ....... 455/456.1 |
| 2004/0137900 A1 * | 7/2004 | Varonen et al. ............. 455/433 |
| 2004/0156372 A1 * | 8/2004 | Hussa ......................... 370/401 |
| 2005/0090251 A1 * | 4/2005 | Kuchibhotla et al. ..... 455/435.1 |

* cited by examiner

*Primary Examiner*—CongVan Tran
(74) *Attorney, Agent, or Firm*—Barnes & Thornburg LLP (57) ABSTRACT

An extension to the Location Information Service (LIS) architecture uses a centralized, user-selected, Privacy Profile Register (PPR) and Presence Register (PR) element, the User Privacy and Presence Register (UPPR) (also known as the Home Register (HR)). This centralized model provides access to value added services that allow the user to be located anywhere in the world by people and services of his choosing. It also provides network elements using this location information with security that the location being provided has certification.

20 Claims, 6 Drawing Sheets

RELATING TO INTERNET PROTOCOL (IP) LOCATION, PRIVACY AND PRESENCE

FIELD OF THE INVENTION

This invention relates to improvements in determining user location and presence, particularly in respect of Internet Protocol (IP) environments and in respect of privacy issues.

Telephone users today subscribe to voice services that are directly linked to and supplied by an access provider. This is the case whether the service is a wireline or a wireless service, so the information required to determine the location of a caller is all controlled by one entity, the service provider. IP telephony provides a separation between service and access provider, with the access provider knowing a user location but not which services are being used, and the service providing knowing which services are in use, but not knowing the location of the user. This can be a substantial problem.

IP solutions also introduce a problem for users of location information, as they need to feel confident that the information being provided to them is accurate, particularly if the information is tied to billing or potentially life threatening situations.

An existing IP location based architecture uses the notion of a Location Information Server (LIS) to provide certified location information for users in a given network, either directly to the user, or to a third party via a query interface in exchange for a location key. This architecture relies on the user directly providing the location key or location object to the end entity, so that end user can only be located if he/she makes the initial contact. Further to this, privacy policies are sent with the object, and elements receiving the object are expect to adhere to these policies, but no formal policing arrangement is enforceable.

One object of the present invention is to provide an IP location, privacy and presence solution which at least overcomes some of the problems of the prior art.

According to one aspect of the present invention, there is provided a location privacy register for selectively enabling access to location information in respect of a user of a communications service, the register being for use in a communications network and having:
  a data store arranged in use to store:
    one or more location privacy rules for the user; and
  a processor arranged in use to:
  receive a first request message from a location information server querying whether or not the location information server may provide location information relating to the user;
  in response, determine whether or not the location information server may provide location information relating to the user in dependence on the one or more location privacy rules for the user; and
  provide a first response message indicating the determination to the location information server.

In one embodiment, the data store is arranged in use to store a location key for the user, the location key enabling a requesting entity to query a location information server to obtain location information relating to the user; and the processor is arranged in use to receive a second request message requesting the location key of the user and, in response, provide a second response message comprising the location key of the user;

In one embodiment, the first request message comprises a service identifier relating to a service to be provided by the entity requesting the location information relating to the user; and the processor is arranged in use to determine whether or not the location information server may provide location information relating to the user in dependence on the service identifier.

In one embodiment, the processor is arranged in use to receive location information relating to the user from the location information server; and determine whether or not the location information server may provide location information relating to the user in dependence on the location information.

In one embodiment, the first request message comprises a user identifier for the user.

In one embodiment, the identifier is one selected from: a Mobile Subscriber ISDN Number (MSISDN) and a user name.

In one embodiment, the processor is arranged in use to receive location key update messages comprising a location key for the user for updating the location key stored in the data store for the user.

In one embodiment, the location key update message is received from a location information server.

In one embodiment, the processor is arranged in use to receive location privacy rule update messages for managing the one or more location privacy rules stored in the data store.

In one embodiment, he location key comprises data indicating a network address for the location information server In one embodiment, the location key comprises data indicating, to the location information server, the identity of the user.

According to another aspect of the present invention, there is provided a location information server for selectively providing location information in respect of a user of a communications service, the server having:
  a data store arranged in use to store:
    location information relating to the user; and
  a processor arranged in use to:
  receive a third request message for location information relating to the user from a requesting entity;
  in response, send a first request message to a location privacy register querying whether or not it may provide location information relating to the user;
  receive a first response message indicating the determination from the location information server; and
  selectively provide the location information relating to the user to the requesting entity in dependence on the first response message.

In one embodiment, the data store is arranged in use to store a location key for the user; the third request message comprises a location key; and the processor is arranged in use to send the first request message or provide the location information only if the location key of the third request message user matches the location key of the user.

In one embodiment, the processor is arranged in use to send to the location privacy server a service identifier relating to a service to be provided by the requesting entity; and In one embodiment, the processor is arranged in use to send location information relating to the user to the location privacy register In one embodiment, the first request message comprise a user identifier for the user.

In one embodiment, identifier is one selected from: a Mobile Subscriber ISDN Number (MSISDN) and a user name.

In one embodiment, the processor is arranged in use to send location key update messages comprising a location key for the user for updating a location key stored by the location privacy server.

In one embodiment, the location key comprises data indicating a network address for the location information server.

In one embodiment, the location key comprises data indicating, to the location information server, the identity of the user.

According to another aspect of the present invention, there is provided a method of selectively enabling access to location data in respect of a user of a communications service, the method comprising the steps of:

storing one or more location privacy rules for the user, receiving a first request message from a location information server querying whether or not the location information server may provide location information relating to the user;

in response, determining whether or not the location information server may provide location information relating to the user in dependence on the one or more location privacy rules for the user; and providing a first response message indicating the determination to the location information server.

According to another aspect of the present invention, there is provided a method of selectively providing location data in respect of a user of a communications service, the method comprising the steps of:

storing location information relating to the user; and receiving a third request message for location information relating to the user from a requesting entity;

in response, sending a first request message to a location privacy register querying whether or not it may provide location information relating to the user;

receiving a first response message indicating the determination from the location information server; and selectively providing the location information relating to the user to the requesting entity in dependence on the first response message.

According to another aspect of the present invention, there is provided a network element for obtaining location information in respect of a user of a communications service, the network element comprising:

a data store arranged to store:

a location key enabling the network element to query a location information server to obtain location information relating to the user; and a service identifier relating to a location based service to be provided by the network element or by an entity requesting the location information relating to the user for which the network element is obtaining location information;

the network element further comprising:

message generation means arranged to generate a location information request message for querying a location information server to obtain location information relating to the user, the location information request message comprising the location key and the service identifier.

In one embodiment, the network element is a Gateway Mobile Location Center.

In one embodiment, the network element provides the location based service.

According to another aspect of the present invention, there is provided a method of obtaining location information in respect of a user of a communications service, the method comprising the following steps:

storing a location key enabling a network element to query a location information server to obtain location information relating to the user;

storing a service identifier relating to a location based service to be provided by the network element or by an entity requesting the location information relating to the user for which the network element is obtaining location information; and generating a location information request message for querying a location information server to obtain location information relating to the user, the location information request message comprising the location key and the service identifier.

The aspects of the present invention have an advantage of providing an extension to the LIS architecture and marrying it with the concept of a centralized, user-selected, Privacy Profile Register (PPR) and Presence Register (PR) element, the User Privacy and Presence Register (UPPR) (also known as the Home Register (HR)). This centralized model provides access to a host of value added services that allow the user to be located anywhere in the world by people and services of his choosing. It also provides network elements using this location information with a sense of security that the location being provided has some kind of certification other than just an end-user's word on it. Further the architecture provides a clean interface to existing 3GPP standards allowing easy inter-working for location services between cellular mobile and IP mobile devices and infrastructure.

In addition the invention provides a common way for roaming or nomadic IP devices to be located.

The architecture also provides privacy protection for an IP user's location. It also describes a logical extension to simple privacy checking supplying a presence function that allows the user to be located by friends, family and service based applications listed in the user's privacy profile.

Reference will now be made by way of example to the accompanying drawings, in which.

The User Privacy Presence Register (UPPR) has two distinct functions. The first is to provide privacy checking for a specific user against a specific service type, this functionality is achieved through the use of the Privacy Profile Register (PPR). The second function of the UPPR is to provide a mechanism that can map username or MSISDN (Mobile Subscriber ISDN Number) into a LocationKey and vice versa, this functionality is provided through the Presence Register (PR).

The IP location privacy and presence architecture identifies 6 specific interfaces. The general functions of these interfaces are described in more detail below. Five of these interfaces are specific to this architecture, while the sixth, the Lpp interface identified for user privacy profile checking in the 3GPP/OMA standards is reused to support IP based users.

Figure 1:
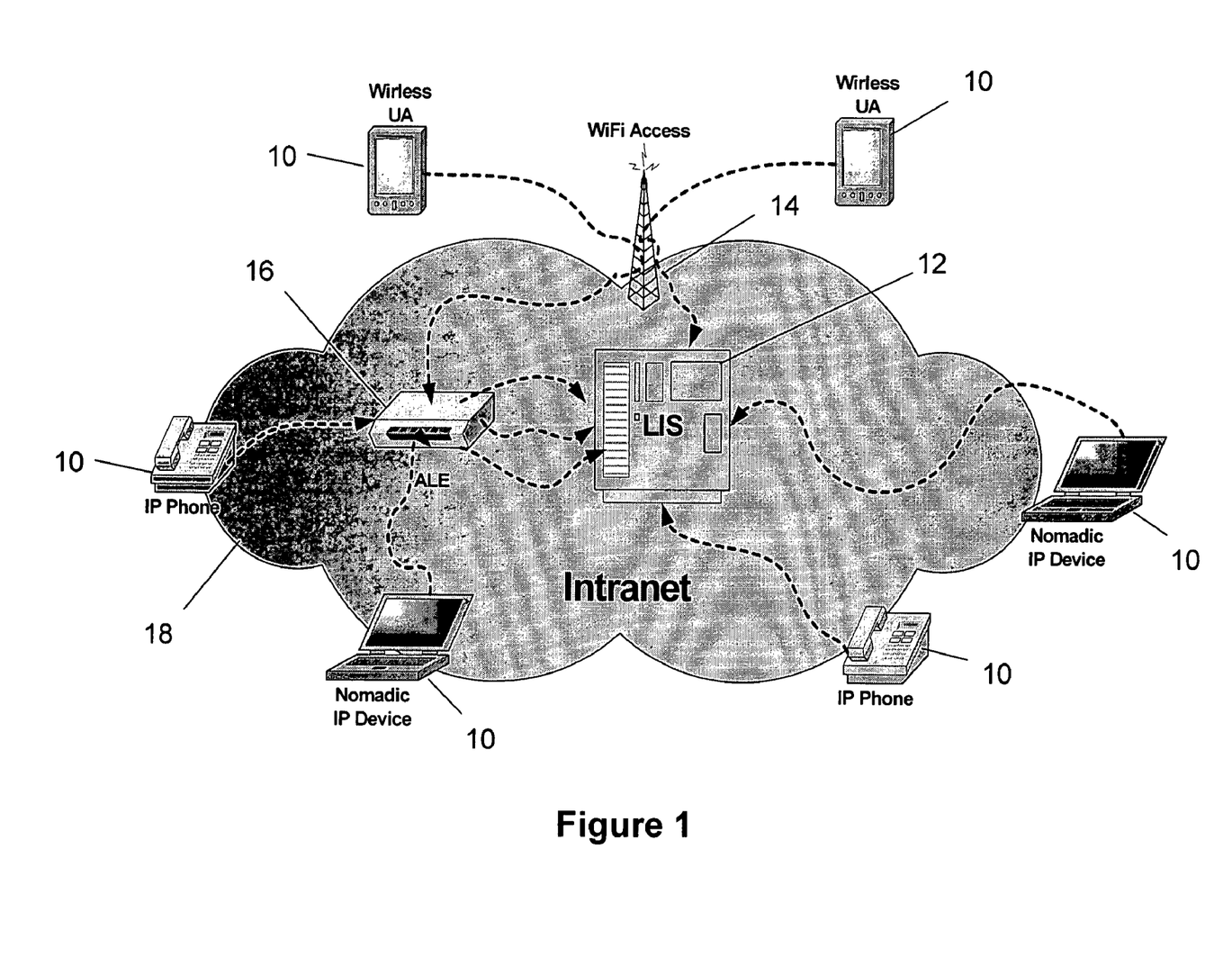
FIG. 1 is a diagram showing the Location Session Protocol (LSP)
Figure 2:
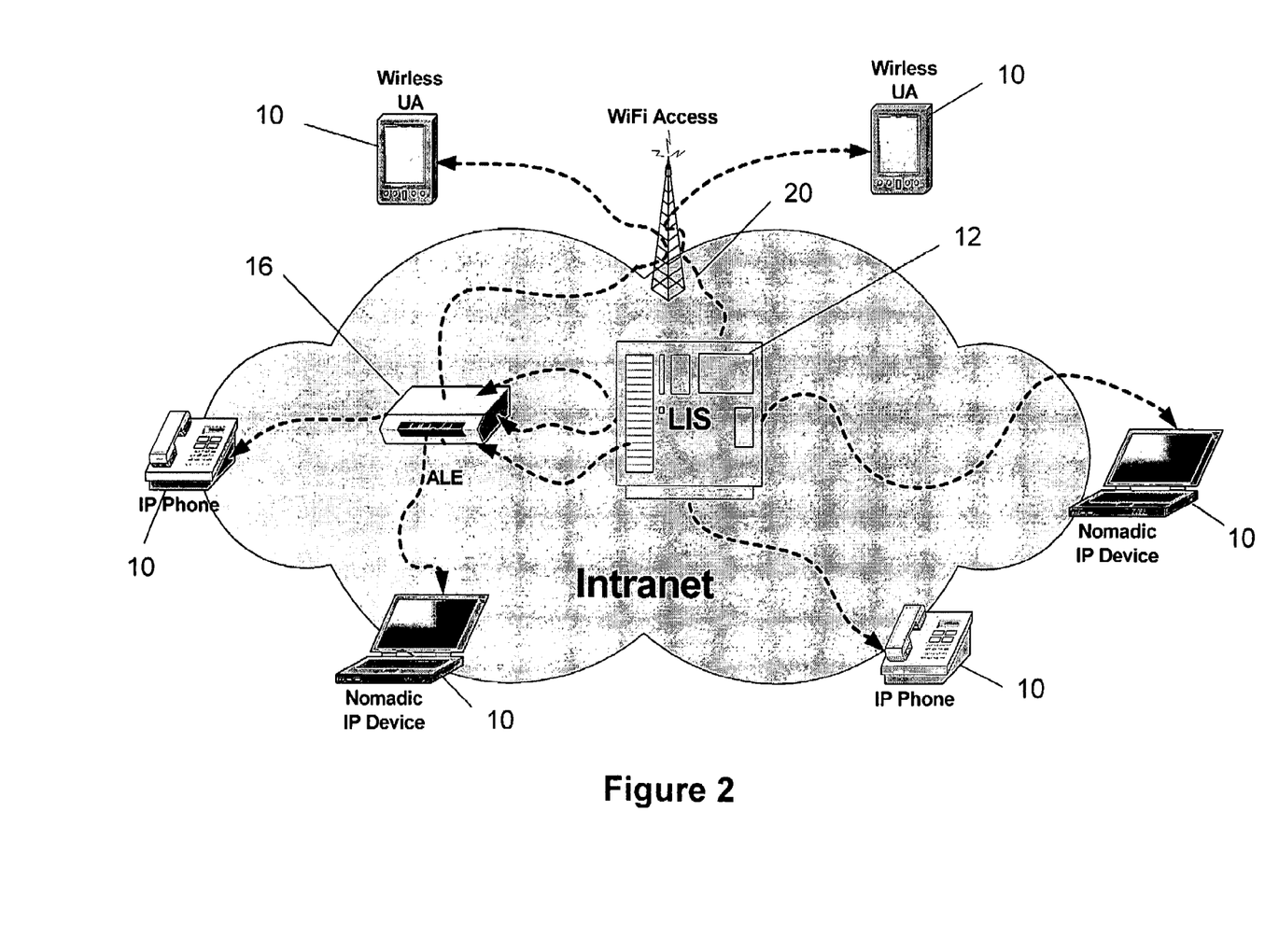
FIG. 2 is a diagram showing the Location Determination Protocol (LDP)
Figure 3:
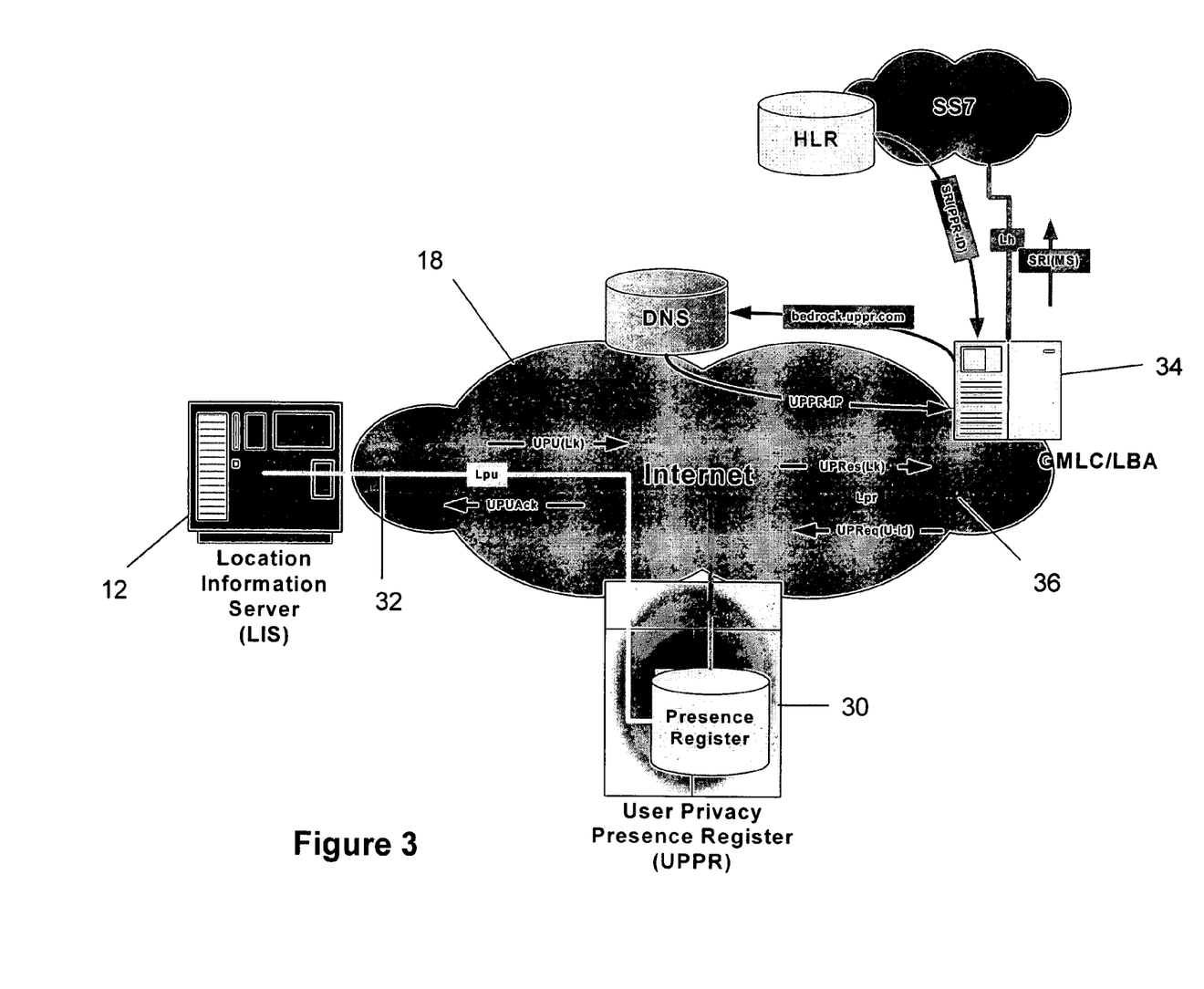
FIG. 3 is a diagram showing Presence reporting according to the present invention.
Figure 4:
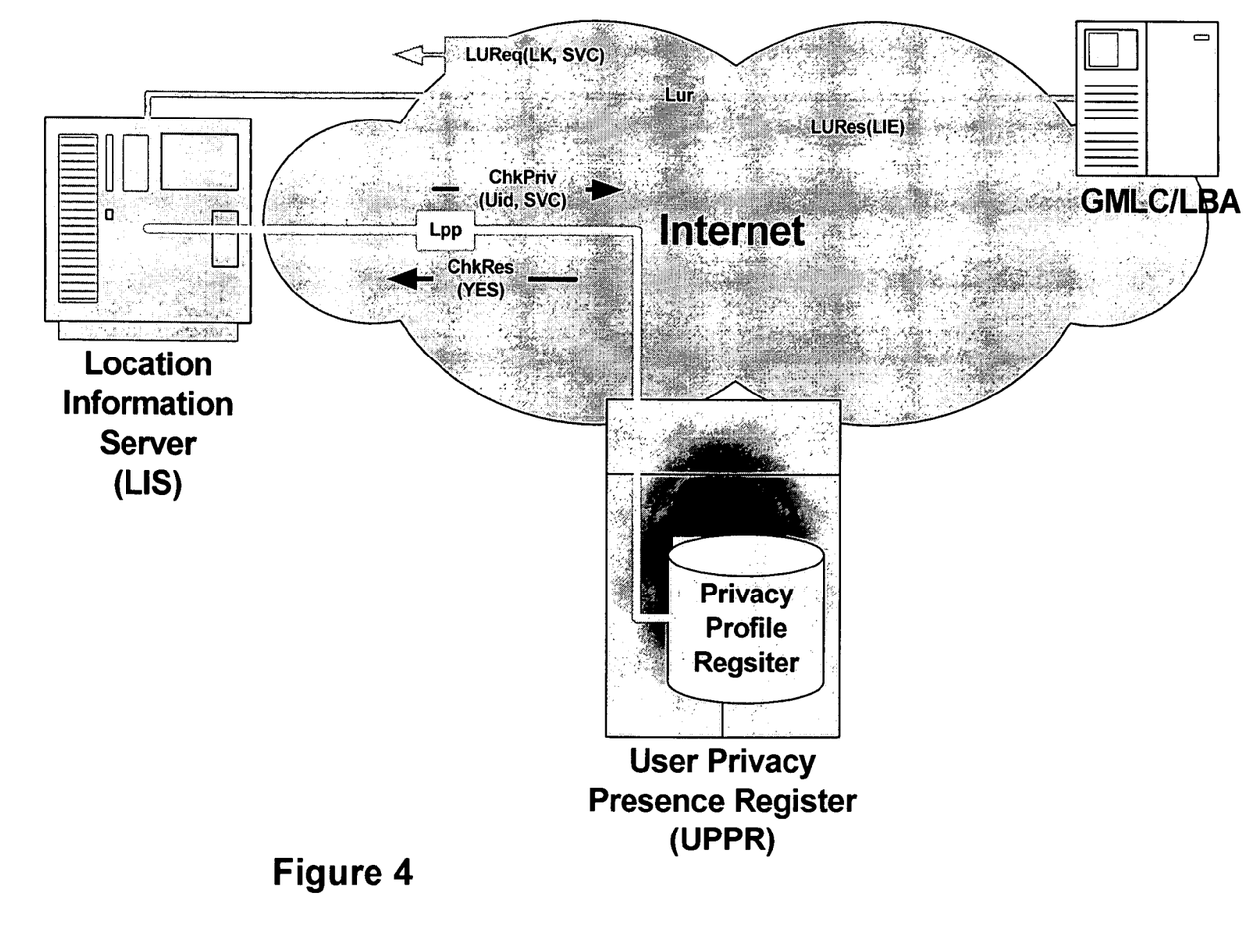
FIG. 4 is a diagram showing location user request protocol (LUR) and location privacy protocol (LPP) interfaces.

The interfaces break down into 3 distinct groups. The first group defines communication between the Location Information Service (LIS) and the User Agent (UA), and subsequent location determination protocols. These are covered by the LIS Session Protocol (Lsp), and the Location Determination Protocol (Ldp) as shown in FIGS. 1 and 2. The second group defines the communicating of presence information from the LIS to the UPPR-PR to the GMLC/LBA (Gateway Mobile Location Centre/Location Based Application) and is made up of the Location Presence Update protocol (Lpu) and the Location Presence Register protocol (Lpr). Location Privacy Protocol (Lpp) as shown in FIG. 3. The third group defines how to get a user's location and describes the Locate User Request protocol (Lur) from the GMLC/LBA to the LIS, and the subsequent privacy check from the LIS to the UPPR-PPR using the Location Privacy Protocol (Lpp) as shown in FIG. 4.

This group is made up of the LIS Session Protocol (Lsp) see FIG. 1 and the Location Determination Protocol (Ldp) see FIG. 2. The Lsp is initiated by a User Agent (UA) 10 and is used to discover and establish a session protocol with a LIS 12. The Lsp discovery process may be by a direct message (14) from the UA to the LIS, or it maybe intercepted by an Access Location Element (ALE) 16, which appends additional information to the discovery message to aid the LIS in determining the UA's location. In either case, the discovery message is received by a LIS, and a session between the UA and the LIS is established. The IP Location Privacy and Presence Architecture requires an extension to the basic Lsp. This extension requires the UA to forward an optional User Presence Update (UPU) message to the LIS. This message allows the LIS to update the User's presence register in the UPPR-PR, and tells the LIS the address of the user's UPPR-PPR to query for the privacy resolution when location requests arrive for the UA.

The user agent 10 is shown in FIG. 1 as a wireless UA, a nomadic IP device such as a computer or an IP phone and in each case is shown either directly connected to the LIS or connected to the LIS via the ALE.

The user may have one or all devices shown or may have any other type of user agent device which can connect to the internet 18.

The Lpd protocol as shown in FIG. 2 is used by the LIS to communicate either with an ALE or with UA to determine the location of the UA. Like elements are given the same reference number as FIGS. 1 and 20 is the communication from LIS to UA 10 either via the ALE or not.

Referring now to FIG. 3, presence communication occurs across two interfaces, from the LIS 12 to the UPPR-PR 30 over the Lpu interface 32, and from the UPPR-PR to a GMLC/LBA 34 over the Lpr interface 36.

The LIS communicates presence information in the form of a User Presence Update (UPU) message which is sent to the UPPR-PR over the Lpu interface. This message maybe sent for a variety of reasons which are captured in detail in the Lpu specification. For example the change of the LocationKey and expiry of the LocationKey messages, as these are mandatory for Lpu interface support. When a user first discovers and establishes a session with a LIS using the Lsp interface, the UA may optionally send a UPU message to the LIS indicating that it has support for value added location services. The LIS will cache the contents of the UPU message and then forward the message to the user's UPPR over the Lpu interface. The UPU message contains details about the user's location, including the user's LocationKey. The UPPR-PR takes the information in the UPU message, and updates the presence information for the user. The UPPR will then acknowledge receipt of the UPU back to the LIS.

Communication between the UPPR-PR and a GMLC/LBA is performed over the Lpr interface. Signalling over this interface may be initiated either by the GMLC/LBA in a poll/pull manner, or by the UPPR-PR on a push basis determined by some pre-arranged trigger. Complete details on the Lpr interface, it capabilities and operation are covered in the Lpr specification. This invention assumes a simple GMLC/LBA poll mechanism for requesting user presence data but could apply to other mechanisms.

To query the UPPR-PR that contains a particular user's presence information, the GMLC/LBA must first be able to identify the UPPR-PR that contains the user's information. This may be done by for example:

1. The GMLC or LBA may have this information pre-provisioned for the user
2. The GMLC requests the IP address of the user's PPR from the user's HLR (Home Location Register). This presupposes that the user is also a cellular subscriber.
3. The GMLC/LBA requests with a fully qualified domain name (FQDN) that can be resolved by a DNS (Domain Name Server).

Once the IP address of the UPPR holding the presence data of the user has been determined, the GMLC/LBA can query the UPPR-PR. The GMLC/LBA sends a User Presence Request message (UPReq) to the UPPR-PR requesting the user presence information. The UPR must contain a means to identify the user, this may be a specific user name (fred@bedrock.uppr.com), it may be an E.164 MSISDN (eg: 61-2-42-233038) or any other appropriate format. Other identifiers shall be adopted as they become defined. If the UPPR is able to find a user record based on provider user key, then it will return the current LocationKey maintained in the user presence register record to the requesting GMLC/LBA. This information is returned over the Lpr interface in a User Presence Response message (UPRes).

The architecture does not preclude an LBA from querying a GMLC using an FQDN (Fully Qualified Domain Name) to identify the user. In this case a modified version of MLP is required such that the FQDN is accepted as user identifier. The GMLC in this mode will simply broker the LBA request to a reliable DNS server, before performing the UPReq over the Lpr interface to the UPPR.

Location queries are made to the LIS over the Lur interface. The LIS has little interest in whether the querying element is a GMLC, an LBA or some other network element, providing that the entity can suitably identify itself to the LIS. After initial validation, the querying entity request a location using a Location User Request (LUReq) message containing a LocationKey and a service identifier. The LIS will validate the LocationKey, terminating the transaction immediately if the key is invalid. Assuming that the LocationKey is valid, the LIS will send a Check Privacy (ChkPriv) message to the UPPR-PPR over the Lpp interface. The ChkPriv message will contain amongst other things the user-id of the user to whom the LocationKey belongs, and the service identifier provided in the LUReq. The UPPR-PPR will provide one of three responses to the ChkPriv message, OK provide the location, NO do not provide the location, or Maybe.

In the case of an OK response to the ChkPriv request, the LIS will determine the location of the user, and return this to the querying party in an LURes message over the Lur interface. In the case of a NO response to the ChkPriv request, the LIS returns an error to the querying party. In the latter case, the LIS must provide the location to the UPPR-PR before a positive or negative answer can be provided.

In all cases the form of the location may be anyone or all of the following:

PIDF-LO Geodetic
PIDF-LO civic
MLP Geodetic
MLP Civic (yet to be specified)

In all cases the location information is transported in a LocationInformationElement (LIE), which is duly date/time stamped and signed by the LIS.

Figure 5:
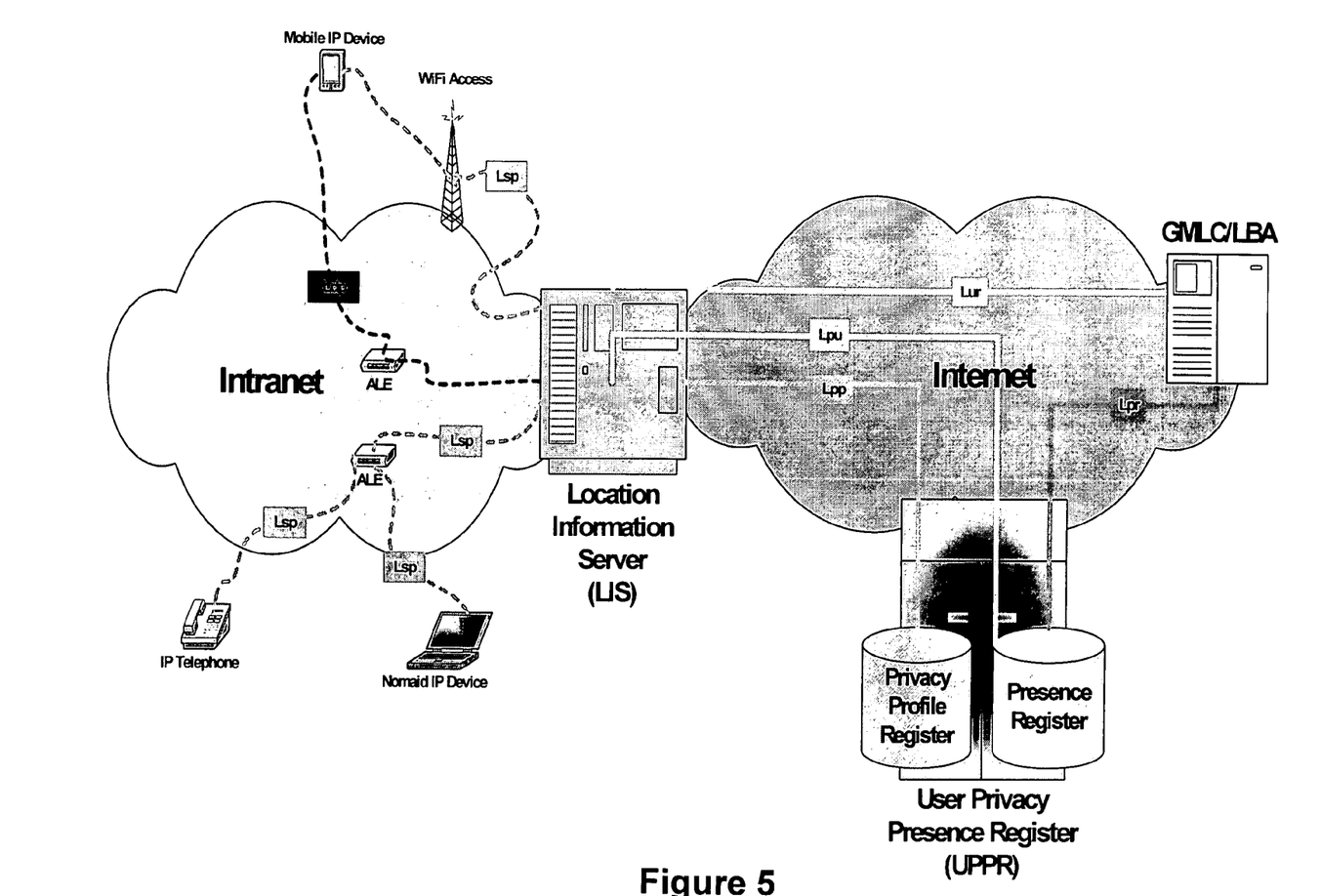
FIG. 5 is a diagram showing the Presence Architecture Interfaces.

FIG. 5 shows the core interfaces that make up the IP Location Privacy and Presence architecture incorporating all elements discussed with respect to FIGS. 14.

In addition to the interfaces shown the following modifications to MLP may also be required:
1. location query support for FQDN and/or LocationKey
2. Civic location support
3. optionally PIDF-LO object type support.

To sum up, this invention describes a location presence architecture that allows a roaming IP user's location to be reported back to his/her "Home User Presence Register", so that location based applications requiring the user's location are able to find him/her. In addition to this, the architecture provides a means by which the Location Information Server (LIS), in the network into which the user has roamed, can check requests for the user's location against the user's home privacy profile maintained in the "Home User Presence Register". The architecture describes the functions of the various elements, and the semantics of the protocols between each element. It further defines how the subscribers' privacy preferences with respect to their location can be managed and enforced.

In addition the commercial implication is significant as it specifies an architecture that has the potential to become or include aspects of a new standard for supporting presence and location of mobile and nomadic IP devices. The architecture as can be seen above fits well into existing 3GPP/OMA standards and has the potential for adoption into the ESTI/TIS-PAN standards as well. Products based on this solution will have global application and likely form the cornerstone of new product markets defined a regulatory bodies in all countries begin to mandate the secure delivery of location information from IP access networks for a whole variety of value added services. There is a particularly important application in the government law enforcement and security area where lawful intercept includes the determination of user geographical location as well as communications content.

There is one element of the previously described scheme which needs further details. This is the LIS discovery and UA management aspects.

A protocol to allow an IP enabled User Agent (UA) to discover and select a Location Information Server (LIS), and subsequently establish a service lease with the LIS is important. The purpose of this lease is to allow the UA to obtain certified location information which it can use in network-based transactions where certified location information is mandated by certain entities. The location information may be in the form of a location key (Lk), a GeoPriv PIDF-LO defined below, or an extended GeoPriv PIDF-LO, and it is valid only for a specified period of time, by the end of which, the UA must either have requested to extend the lease, or the LIS will expire the lease rendering the location information invalid.

The UA discovers the LIS by sending out a LISDISCO IP broadcast to a well known UDP port (to be request from IANA) and waits for a LIS to respond.

Alternatively the broadcast may be intercepted by an Access Location Element (ALE) which will provide additional information such as UA MAC, UA port number and access category information before sending the LISDISCO on to a specific LIS. This additional information can be used by the LIS to aid in speeding up location determination.

All LISs receiving a LISDISCO message may respond with a LISOFFER message which indicates the capabilities of the LIS to the UA, a public key that can be used to establish a secure session with the LIS, and a value for T1 as the time taken to determine location needs to be a network tuneable parameter.

Upon receiving one or more LISOFFER messages, the UA will select the LIS offering the capabilities that it requires. The UA will then randomly generate a session key (Sk) to be used for encrypting session information exchanged with the LIS. The UA will encrypt the session key with the LIS's public/key contained in the LISOFFER message.

The UA will construct a list of options for location that can be used by the LIS to provide location and privacy interpretation. The defined options are:

Location Key
basic PIDF-LO-GEO
basic PIDF-LO-CIVIC
extended PIDF-LO-GEO
extended PIDF-LO-CIVIC The UA will encrypt the requested options using a cipher-block-chaining technique. The encrypted options, will be appended to the encrypted session key, which will then be sent to the LIS well known UDP port (to be allocated by IANA) in a LOCREQUEST message. After sending the LOCREQUEST message the UA shall set a timer T1 within which it should expect to see a LOCRESPONSE from the LIS. Where a PIDF-LO is being requested, T1 could be in the range of 30 to 90 seconds.

The LIS receives the LOCREQUEST message from the UA and decrypts the session key using the LIS's private key. The LIS then proceeds to decrypt the service options and data passed from the UA.

The LIS will create an identifier, referred to as the "handle", for the client session. The LIS will then cache and associate session data with the handle. Session data will include:

UA provided data such as that contained in the various options, and policy data such as may be provided for PIDF-LOs
PIDF-LOs, Location Keys
Lease expiry time
Session key
UA access category If the UA has only requested a LocationKey, then the LIS will generate a LocationKey and return this to the UA immediately, the initial lease time may be short while the LIS determines the category and location of the UA. Alternatively if an ALE provided category and location information in the LISDICO, then the LIS will provide the UA with final values. In the case of the PIDF-LOs, it may take the LIS some time to be able to determine the actual location of the UA and this will delay the subsequent response from the LIS to the UA.

When the LIS has determined the information to be included in the response to the UA, it will encrypt the response options using the session key, and send the subsequent LOCRESPONSE to the UA.

In the case where an ALE was used in the initial LIS discovery, the LIS will be able to use information provided by the ALE to speed up certain location determination operations. Where an ALE was not used, or information was not provided by the ALE, the LIS will need to determine these before a location can be attributed to the UA.

The LIS will use the UA IP address, and if provided the MAC address to determine the access category of the UA by communicating with an Access Location Element (ALE) residing in the UA's subnet or local network. Valid UA access categories are:

0x00 Unkown
0x01 Fixed
0x02 Nomadic
0x03 Mobile

The LIS will also request the serving-node of the UA from the ALE, with the returned nodal information being dependent on the access category. Currently identified category to nodal type values are defined in the following table:

TABLE 1

UA Category Mappings

| UA Category | Nodal type | Example: |
|---|---|---|
| 0x00 | Switch-id, Port# | WOLL-01, 24 |
| 0x01 | Switch-id, Port# | MELB-01, 09 |
| 0x02 | Switch-id, Port# | SYD-05, 44 |
| 0x03 | WiFi-id | WiFi-WOLL-02 |

Detailed LIS to ALE communications are not described in detail but may be of any appropriate form.

The LIS will key off the returned nodal information to determine the location of the UA, and will cache this information against the handle. If the UA requested a PIDF-LO or extended PIDF-LO, then the LIS will construct this object and cache it also. It should be noted that the PIDF-LO constructed will use the rule object provided with the PIDF-LO or extended PIDF-LO options, if no rule is provided then no rules will be included in the subsequent PIDF-LOs.

The LIS should provide short lease times for category 0x03 UAs, medium lease times for category 0x02 UAs, and relatively long lease times for category 0x01 UAs. Where the access type is unknown (category 0x00), the LIS may use a default lease time.

Lease renewal should occur by default at ⅔ of the lease expiry time returned in the LOCRESPONSE message. This consists of the UA sending a LOCRENEW message to the LIS. The LOCRENEW message contains the following:

IP address of the UA
Encrypted data
  System time at the UA
  Assigned-client handle
  Requested options
    Location key
    PIDF-LO
    Extended PIDF-LO The LOCRENEW message is a direct exchange between the UA and the LIS, as such there is no ALE intervention, so it may be necessary for the LIS to completely re-determine locations for some categories of user. Whether and how the LIS determines user location at lease renewal time is LIS implementation and policy dependent. The response to a LOCRENEW message is a LOCRESPONSE containing either an error or valid location information.

When a UA no longer requires a location session with the LIS, it should send a LOCRELEASE message to the LIS. Upon receiving a LOCRELEASE message from a valid UA, the LIS will clean up the UA's session data, removing all indication of the client session.

The two major data types identified herein are now described. These are the LocationKey and the Extended PIDF-LO and includes how various fields within a standard PIDF-LO are determined and filled in by the LIS.

The LocationKey provides a means by which the LIS can be interrogated by an external entity to provide the location of a user inside the LIS's internal network. The initial requirement for this interface is for emergency services support to mobile or nomadic IP telephony users. The notion of an external entity querying the LIS for a location is described as a 'Using Protocol' in the figures, where the Location Server is the LIS, and the Target is the UA. The LocationKey provides the identity of the LIS to query, and a Client-ID that the LIS can use to identify the specific user inside the LIS network. The LocationKey also provides a salt that the LIS can use to aid in determining the validity of the LocationKey being presented. The format of the LocationKey is provided below.

```
<LocationKey>
  <LID-ID>................</LIS-ID>
  <CLIENT-ID>.............</CLIENT-ID>
  <SALT>.............</SALT>
</LocationKey>
```

The PIDF-LO as defined below provides a description of three basic elements that come together to define the location of a user and how that location information may be used. These elements are:

The "entity attribute"
The "Status" element
The timestamp element

The "Status" element as used in this specification is further broken down into the actual location information, Geodetic and Civic, and a rule set, the latter being optional. How the ruleset is specified and encoding in the message sent to the LIS is defined below.

The "entity attribute" defines the target, in this case the UA, to which the location is attributed. The aim of this paper to describe a means by which a LIS can provide certified location information. Since the LIS can only be certain of identifying the UA within its domain, the LIS creates an entity presence element URI based on the fields that it would use to create a LocationKey for the same UA, namely client-id, LIS-ID and Salt. This is defined in the following manner:

Entity="pres:client-id@LIS-ID?Salt=Salt.value"

In this manner, the PIDF-LO indicates that the UA for which this information is pertinent is resident in the LIS's domain and that the LIS can provide information about the UA.

The timestamp element specifies when the PIDF-LO was created, but provides no indication as to when the object will no longer be valid.

The basic PIDF-LO provided by the LIS will look similar to:

```
<?xml version="1.0" encoding="UTF-8" ?>
<presence xmlns="urn:ietf:params:xml:ns:pidf"
 xmlns:gp="urn:ietf:params:xml:ns:pidf:geopriv10" xmlns:gml=
 "http://www.opengis.net/gml"
 xmlns:xsi="http://www.w3.org/2001/XMLSchema-instance"
 xsi:schemaLocation="urn:ietf:params:xml:ns:pidf pidf.xsd
 urn:ietf:params:xml:ns:pidf:geopriv10 pidf-geopriv10.xsd"
 entity="pres:7CA0F337@lis.example.com?salt=54E3EE99">
  <tuple id="sg89ae">
    <status>
      <gp:geopriv>
        <gp:location-info>
          <gml:location>
            <gml:Point gml:id="point1" srsName="epsg:4326">
              <gml:coordinates>37:46:30N 122:25:10W
              </gml:coordinates>
            </gml:Point>
          </gml:location>
        </gp:location-info>
```

-continued

```
      <gp:usage-rules>
     </gp:geopriv>
    </status>
    <timestamp>2003-06-22T20:57:29Z</timestamp>
   </tuple>
</presence>
```

The basic PIDF-LO provides location, and as described above a tie back to a user in a domain. The requirements set out in the NENA I2 emergency services support for VoIP recommendations stipulate that location must be:
 1. attributed to a trusted source;
 2. are applicable to a particular point in time; and
 3. can be attributed to an individual user.

The previous section addresses point 3, but only addresses half of point 2 as the continued validity of the information is not brought into question. These requirements could be acquired using S/MIME, however S/MIME is not always the most practical mechanism for doing so, and is unlikely to be used when transporting PIDF-LOs over SIP.

Alternatively an expiry time and subsequent signature can be applied to the PIDF-LO so that all three requirements can be satisfied in situations where S/MIME may not be practical.

The expiry time is added to the base PIDF by including an additional name space identifier. The schema definitions for the additional name space is defined in Appendix A.

urn:ieff:params:xml:ns:pidf:expiry pidf-expiry.xsd

With the name space included, the PIDF expiry time is inserted into the XML document.

```
<pidf-expiry:expiry-time>
    2003-07-22T20:57:29Z
</pidf-expiry:expiry-time>
```

The LISDISCO is generated based on the following assumptions:
 If one IP address is IPv6 then both are.
 Blue is mandatory
 UA-Systime is a 32 bit unsigned integer representing the number of seconds elapsed since midnight, 1 Jan. 1970 UTC.
 Red is mandatory for ALEs to fill in
 0x00s whould be used where information is unknown
 Port is optional
 Version 0x1 (4 bits)
 IPVersion 0x4 or 0x6 (4 bits)
 OpCode 0x01 (1 byte)
 UA-Systime (4 bytes)
 SrcHdwAddr (6 bytes)
 UA-IP (4 or 16 bytes)
 ALE-IP (4 or 16 bytes)
 confHdwAddr (6 bytes)
 UACat 0x00,0x01,0x02,0x03 (1 byte)
 portLen (1 byte)
 Port The LISOFFER message uses the same common header format of protocol version, IP version and operation code (OpCode).

It contains the LIS IP address.

A value for T1 which is a 32 bit unsigned integer representing the number of seconds elapsed since midnight, 1 Jan. 1970 UTC.

An RSA modulus value expressed as an Multiple Precision Integer (MPI), two bytes indicating length in bits, followed by the value in big-endian format (high order integer byte read first). In version 1 of the LIS discovery protocol the RSA modulus shall not exceed 1024 bits and shall be no smaller than 512 bits.

An RSA base value expressed as an MPI.

An optional signature over the whole message using MD-5 (and verifiable with the included public key) may be used. The signature is zero padded, as required, at the MSD such that it is same length (in bits) as the provided modulus.
 Version 0x1 (4 bits)
 IPVersion 0x4 or 0x6 (4 bits)
 OpCode 0x02 (1 byte)
 LIS-IP (4 or 16 bytes)
 T1-Value (4 bytes)
 OptionBitMap (1 byte)
 ModLen (2 bytes)
 Modulus ((ModLen.value +7)/8 bytes)
 BaseLen (2 bytes)
 Base ((BaseLen.value +7)/8 bytes)
 Signature ((ModLen.value +7)/8 bytes)

The OptionBitMap field defines the options location options that the LIS can support to a UA. If the LIS can supply the option then the appropriate bit set to 1, if the option si unavailable then the option is set to 0.

TABLE 2

LISOFFER Option Bitmap

| Bit Number | Meaning |
| --- | --- |
| 7 | Location Key |
| 6 | PIDF-LO-GEO |
| 5 | PIDF-LO-CIVIC |
| 4 | Extend-PIDF-LO |
| 3 | Padding |
| 2 | Padding |
| 1 | Padding |
| 0 | Padding |

The UA has the option of validating the signature if desired. The key form of validation would be to check the value of the LIS-IP address returned in the LISOFFER message against the source IP of the IP packet. The assurance provided here is that the creator of the message contents is the IP source and that the contents of the message have not changed. It does not provide any security above this.

In order to support IP based location information in countries where export policy restricts the key length of symmetric key algorithms, varying key length DES and AES ciphers is provided.

The cipher type and session key lengths are provided in a modified MPI format, where the high order nibble of the length indicator specifies the cipher type. The remaining 12 bits of the MPI length indicator specify the number of bits applicable to the session key. The following table shows the valid set of values for the MPI length indicator, and type of encryption that will be employed:

TABLE 3

LOCREQUEST Cipher Indicator

| Cipher Nibble Value | Specified Key Length (bits) | Cipher type used |
|---|---|---|
| 0x0 | 48 | Not Valid |
| 0x0 | 64 | Not Valid |
| 0x0 | 128 | 128 bit AES |
| 0x0 | 192 | 192 bit AES |
| 0x0 | 256 | 256 bit AES |
| 0x1 | 48 | 40 bit DES |
| 0x1 | 64 | 56 bit DES |
| 0x1 | 128 | 2 key triple DES |
| 0x1 | 192 | 3 key triple DES |
| 0x1 | 256 | Not Valid |

Prior to encryption with the LIS public key the format of the session key is as follows:
CipherType (4 bits)
KeyLength (12 bits)
Key Since the minimum modulus value for the RSA key is 512 bits, and the maximum session key value is 256+16 (272) bits there is no need to specify the length of the session key encrypted component in the LOCRequest message it is always as long as the RSA modulus. However in different examples this may vary.

The OptionBitmap is encoded in a bit map similar to the LISOFFER option bitmap.

TABLE 4

LOCREQUEST Option bitmap

| Bit Number | Meaning |
|---|---|
| 7 | LocationKey |
| 6 | PIDF-LO-GEO |
| 5 | PIDF-LO-CIVIC |
| 4 | Extend-PIDF-LO |
| 3 | Padding |
| 2 | Padding |
| 1 | Padding |
| 0 | Padding |

The UA selects which options it is requesting. If a PIDF-LO option is selected and the extended option is also selected then an extended PIDF-LO type is created. If both a GEO and a CIVIC PIDF-LO are selected, then these will be combined into the same PIDF-LO response from the LIS.

The PIDF-LO type allows the UA to optionally specify a ruleset. The rules that are specified covered in the RuleField parameter which is a bit mask corresponding the various parts of the PIDF-LO supported. The ruleset using CID URI convention is not supported as this requires a file to be transferred using S/MIME in preference an external entity will maintain the rules to be used.

TABLE 5

PIDF-LO Ruleset Bitmap

| RuleField Bit | Bit Value |
|---|---|
| 7 | Retransmission control. 1 = allow, 0 = disallow |
| 6 | Expiry Specified |
| 5 | Rule set specified |
| 4 | Notes specified |
| 3 | Padding |
| 2 | Padding |
| 1 | Padding |
| 0 | Padding |

ExpiryTime is a 32 bit unsigned integer representing the number of seconds that location is valid for. The LIS may reduce this time based on the category of the user, but the expiry time will NEVER be longer than the time requested.
RuleLen specifies the length of the Ruleset URI
Ruleset specifies the actual ruleset URI
NotesLen specifies the length of the notes section
Notes specifies the actual user notes.
Version 0x1 (4 bits)
IPVersion 0x4 or 0x6 (4 bits)
OpCode 0x03 (1 byte)
SK ((LISOFFER.ModLen.value +7)/8 bytes)
OptionBitMap (1 byte)
RuleField:=0x00 to 0xF0 (1 Byte)
ExpiryTime:=0x00000000 to 0xFFFFFFFF (4 bytes)
RuleLen:=0x0000 to 0x0FFF (2 bytes)
RuleSet:=(RuleLen.value bytes)
NotesLen:=0x0000 to 0x0FFF (2bytes)
Notes:=(NotesLen.value bytes)

The LOCRESPONSE consists of the standard header version, IP-Version and OpCode, followed by a 2 byte random field which is used to ensure that cipher block chaining mechanism used does not always reveal the handle value by providing the same cipher block.

In version 1 of the protocol, at most two options will be returned, a LocationKey and or some type of PIDF-LO. The location elements contained in the PIDF-LO are also indicated in the OptionBitMap, but at most only one PIDF-LO object is returned.
Version 0x1 (4 bits)
IPVersion 0x4 or 0x6 (4 bits)
OpCode 0x04 (1 byte)
RAND (2 bytes)
Handle (8 bytes)
LeaseExpiry (4 bytes)
OptionBitMap (1 byte)
OptionLen1 (2 bytes)
Option1 (OptionLen1.value bytes)
OptionLen2 (2 bytes)
Option2 (OptionLen2.value bytes)

The LOCRENEW message is sent to the when the UA needs to renew its lease with the LIS. The UA sends its requested options again, along with a random number to obscure the LIS handle, the UA's system time, and the previously provided PIDF-LO ruleset, if a PIDF-LO is being renewed.
Version 0x1 (4 bits)
IPVersion 0x4 or 0x6 (4 bits)
OpCode 0x05 (1 byte)
RAND (2 bytes)
Handle (8 bytes)
UATime (4 Bytes)
OptionBitMap (1 byte)
RuleField:=0x00 to 0xF0 (1 Byte)
ExpiryTime:=0x00000000 to xFFFFFFFF (4 bytes)
RuleLen:=0x0000 to 0x0FFF (2 bytes)
RuleSet:=(RuleLen.value bytes)
NotesLen:=0x0000 to 0x0FFF (2bytes)

Notes:=(NotesLen.value bytes)

The LOCRELEASE message is sent from the UA to the LIS when the UA no longer requires location information. The UA sends the standard header, random number and LIS handle. At this point the session between the UA and the LIS is terminated.

Version 0×1 (4 bits)
IPVersion 0×4 or 0×6 (4 bits)
OpCode 0×06 (1 byte)
RAND (2 bytes)
Handle (8 bytes)

Figure 6:
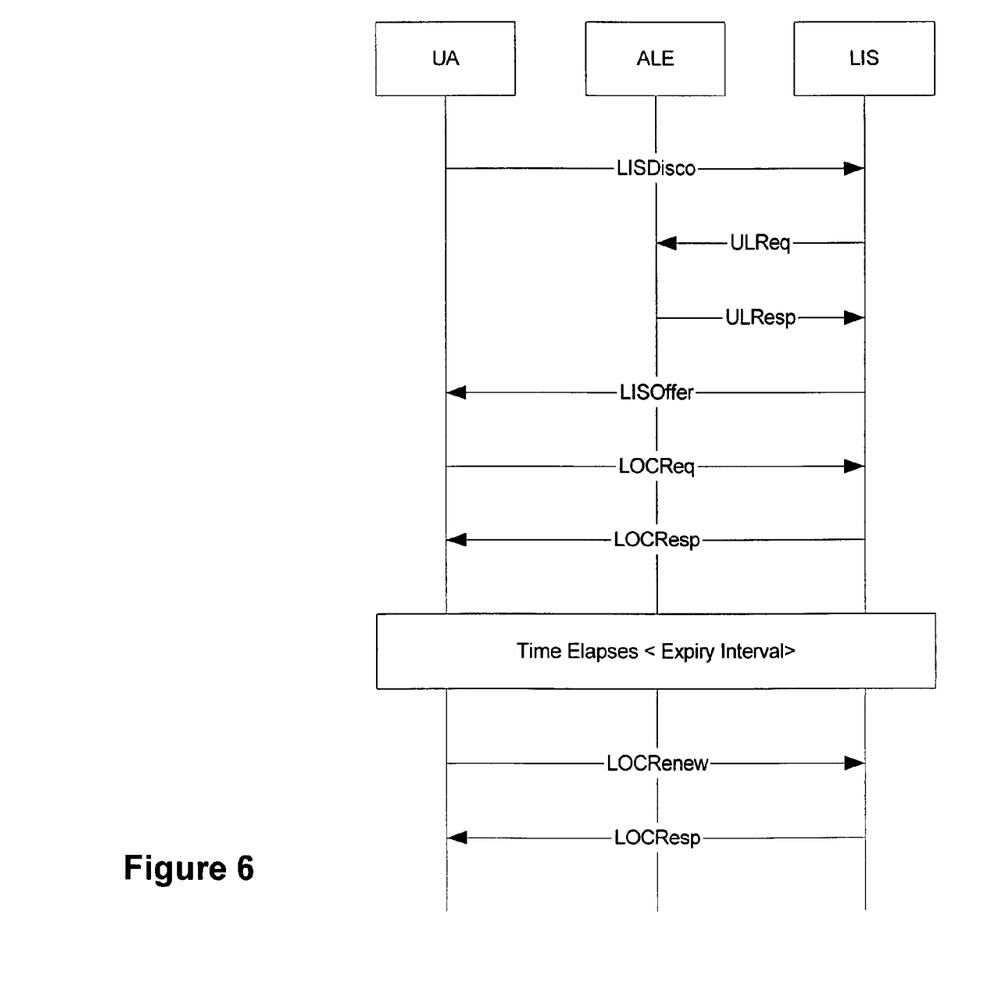
FIG. 6 is a diagram showing an example of a User Agent (UA) Location Information Server (LIS) discovery message flow.

The message flows will now be described with reference to FIG. 6.

The key failure scenarios involve:
LIS failure to decrypt LOCREQUEST details
UA unable to decrypt LOCRESPONSE details
UA unable to use location options provided by LIS
LOCREPONSE timer T1 expires
LOCRENEW message not responded to within T1
UA fails to renew lease before lease expiry time is passed 1) LISOFFER message:
a) If a X.509 certificate is used, the response becomes quite big, and full certification is not actually needed, all that is needed is the key and algorithm information. If more than one algorithm is supported flexibility is introduced, but the UA client is made far more complex as it will need to support multiple encryption formats.
b) Considered using Diffie-Hellman key exchange. Three concerns appear here. First the high cost of multiplications and logs required on the UA side. Second if message exchange was to be kept small, LIS would need to send p, q and q^x mode p in the same message, and this would require the LIS to keep client state before the offer has been extended. To 25 avoid this the third problem comes into play, as LIS would send p, q, UA would send back p, q, q^y mod p, LIS would then have to respond with a q^x mod p before any further messaging could take place. This would be necessary to perform some kind of internal hash to get the key length down to a reasonable length for session key manipulation.
c) Using vanilla RSA. Solution described above seems to answer the need.

APPENDIX A

```
<?xml version="1.0"?>
<xsd:schema xmlns:xsd="http://www.w3.org/2001/XMLSchema"
      targetNamespace="urn:ietf:params:xml:ns:pidf:expiry"
      xmlns="urn:ietf:params:xml:ns:pidf:expiry"
      elementFormDefault="qualified"
      attributeFormDefault="unqualified">
  <xsd:annotation>
    <xsd:documentation>
    This schema describes an extra element that specifies the expiry time
    for the presence object.
    </xsd:documentation>
  </xsd:annotation>
  <xsd:element name="expiry-time" type="xsd:dateTime">
    <xsd:annotation>
      <xsd:documentation>
      This item defines the end of the validity period for the presence
      object. An issuing server may append this item to either a tuple or
      the entire presence object.
      Signed presence objects SHOULD include this element within the
      scope of the presence element. A presence object SHOULD be
      considered unsigned if this element is not present within the scope
      of the presence element.
      </xsd:documentation>
    </xsd:annotation>
  </xsd:element>
</xsd:schema>
```

The invention claimed is:

1. A location privacy register for selectively enabling access to location information in respect of a user of a communications service, the register being for use in a communications network and having:
   a data store arranged to store:
      one or more location privacy rules for the user; and
   a processor arranged to:
      receive a first request message from a location information server querying whether or not the location information server may provide location information relating to the user;
      in response, determine whether or not the location information server may provide location information relating to the user in dependence on the one or more location privacy rules for the user; and
      provide a first response message indicating the determination to the location information server;
   wherein the data store is arranged to store a location key for the user, the location key enabling a requesting entity to query the location information server to obtain location information relating to the user; and the processor is arranged to receive a second request message requesting the location key of the user and, in response, to provide a second response message comprising the location key of the user.

2. A location privacy register according to claim 1, wherein:
   the first request message comprises a service identifier relating to a service to be provided by the entity requesting the location information relating to the user; and
   the processor is arranged to determine whether or not the location information server may provide location information relating to the user in dependence on the service identifier.

3. A location privacy register according to claim 1, wherein the processor is arranged to:
   receive location information relating to the user from the location information server; and
   determine whether or not the location information server may provide location information relating to the user in dependence on the location information.

4. A location privacy register according to claim 1, wherein the first request message comprises a user identifier for the user.

5. A location privacy register according to claim 4, wherein the user identifier is one selected from: a Mobile Subscriber ISDN Number (MSISDN) and a user name.

6. A location privacy register according to claim 1, wherein the processor is arranged to receive location key update messages comprising a location key for the user for updating the location key stored in the data store for the user.

7. A location privacy register according to claim 6, wherein the location key update message is received from a location information server.

8. A location privacy register according to claim 1, wherein the processor is arranged to receive location privacy rule update messages for managing the one or more location privacy rules stored in the data store.

9. A location privacy register according to claim 1, wherein the location key comprises data indicating a network address for the location information server.

10. A location privacy register according to claim 9, wherein the location key comprises data indicating, to the location information server, the identity of the user.

11. A location information server for selectively providing location information in respect of a user of a communications service, the server having:
- a data store arranged to store:
  - location information relating to the user; and
- a processor arranged to:
  - receive a third request message for location information relating to the user from a requesting entity;
  - in response, send a first request message to a location privacy register querying whether or not it may provide location information relating to the user;
  - receive a first response message indicating the determination from the location privacy register; and
  - selectively provide the location information relating to the user to the requesting entity in dependence on the first response message;
  - wherein the processor is arranged to send location key update messages comprising a location key for the user for updating a location key stored by the location privacy register.

12. A location information server according to claim 11, wherein:
- the data store is arranged to store a location key for the user;
- the third request message comprises a location key; and
- the processor is arranged to send the first request message or provide the location information only if the location key of the third request message user matches the location key of the user.

13. A location information server according to claim 11, wherein the processor is arranged to send to the location privacy register a service identifier relating to a service to be provided by the requesting entity.

14. A location information server according to claim 11, wherein the processor is arranged to send location information relating to the user to the location privacy register.

15. A location information server according to claim 11, wherein the first request message comprises a user identifier for the user.

16. A location information server according to claim 15, wherein the user identifier is one selected from: a Mobile Subscriber ISDN Number (MSISDN) and a user name.

17. A location information server according to claim 11, wherein the location key comprises data indicating a network address for the location information server.

18. A location information server according to claim 17, wherein the location key comprises data indicating, to the location information server, the identity of the user.

19. A method of selectively enabling access to location data in respect of a user of a communications service, the method comprising the steps of:
- storing one or more location privacy rules for the user;
- receiving a first request message from a location information server querying whether or not the location information server may provide location information relating to the user;
- in response, determining whether or not the location information server may provide location information relating to the user in dependence on the one or more location privacy rules for the user;
- providing a first response message indicating the determination to the location information server;
- storing a location key for the user, the location key enabling a requesting entity to query a location information server to obtain location information relating to the user;
- receiving a second request message requesting the location key of the user; and
- in response, providing a second response message comprising the location key of the user.

20. A method of selectively providing location data in respect of a user of a communications service, the method comprising the steps of:
- storing location information relating to the user;
- receiving a third request message for location information relating to the user from a requesting entity;
- in response, sending a first request message to a location privacy register querying whether or not it may provide location information relating to the user;
- receiving a first response message indicating the determination from the location information server;
- selectively providing the location information relating to the user to the requesting entity in dependence on the first response message; and
- sending location key update messages comprising a location key for the user for updating a location key stored by a location privacy register.

* * * * *

UNITED STATES PATENT AND TRADEMARK OFFICE
CERTIFICATE OF CORRECTION

PATENT NO. : 7,627,331 B2
APPLICATION NO. : 11/257709
DATED : December 1, 2009
INVENTOR(S) : Winterbottom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 887 days.

Signed and Sealed this

Second Day of November, 2010

David J. Kappos
*Director of the United States Patent and Trademark Office*